US012686261B2

(12) United States Patent
Jeong et al.

(10) Patent No.: US 12,686,261 B2
(45) Date of Patent: Jul. 21, 2026

(54) CONTROL VALVE AND COOLING SYSTEM FOR VEHICLE INCLUDING THE SAME

(71) Applicants: HYUNDAI MOTOR COMPANY, Seoul (KR); KIA CORPORATION, Seoul (KR); GMB KOREA CORP., Changwon-si (KR)

(72) Inventors: Yeon Man Jeong, Yongin-si (KR); Kyung-Hwan Kim, Incheon (KR)

(73) Assignees: HYUNDAI MOTOR COMPANY, Seoul (KR); KIA CORPORATION, Seoul (KR); GMB KOREA CORP., Changwon-si (KR)

( * ) Notice: Subject to any disclaimer, the term of this patent is extended or adjusted under 35 U.S.C. 154(b) by 127 days.

(21) Appl. No.: 18/223,674

(22) Filed: Jul. 19, 2023

(65) Prior Publication Data

US 2024/0123814 A1 Apr. 18, 2024

(30) Foreign Application Priority Data

Oct. 18, 2022 (KR) ......................... 10-2022-0133738

(51) Int. Cl.
*F16K 5/06* (2006.01)
*B60K 11/02* (2006.01)
(Continued)

(52) U.S. Cl.
CPC ............ *B60K 11/02* (2013.01); *F16K 5/0605* (2013.01); *F16K 5/10* (2013.01); *F16K 11/0876* (2013.01); *F16K 27/067* (2013.01)

(58) Field of Classification Search
CPC ......... B60K 11/02; F16K 5/0605; F16K 5/10; F16K 11/0876; F16K 27/067; F16K 11/0856; F16K 31/004; F16K 31/041; F16K 31/043; F16K 31/535; F16K 31/0613; F16K 11/07; F16K 5/201; F16K 5/0663; F16K 5/0689; F16K 5/0471; F16K 27/041;
(Continued)

(56) References Cited

U.S. PATENT DOCUMENTS 2,229,931 A * 1/1941 Parker ..................... F16K 39/06
137/625.22
2,559,588 A * 7/1951 Blumenthal .............. F41G 5/00
89/203
(Continued)

FOREIGN PATENT DOCUMENTS

JP 2021-164332 A 10/2021
KR 10-2249052 B1 5/2021
KR 2022-0001670 A 1/2022

*Primary Examiner* — Craig J Price
(74) *Attorney, Agent, or Firm* — MCDONNELL BOEHNEN HULBERT & BERGHOFF LLP

(57) ABSTRACT

A control valve includes a valve housing, a first inlet port and a second inlet port that are formed on the valve housing and through which a coolant is drawn, a first outlet port and a second outlet port that are formed on the valve housing and through which the coolant is discharged, and a ball valve rotatably disposed within the valve housing, and configured to fluidically communicate the first inlet port and the first outlet port and fluidically communicate the second inlet port and the second outlet port, or fluidically communicate the first inlet port and the second outlet port and fluidically communicate the second inlet port and the first outlet port.

11 Claims, 20 Drawing Sheets

(51) Int. Cl.
*F16K 5/10* (2006.01)
*F16K 11/087* (2006.01)
*F16K 27/06* (2006.01)

(58) Field of Classification Search
CPC ...... F16K 27/00; F16K 37/005; F16K 27/065;
F16K 11/165; F16K 11/08; F16K
37/0041; F16K 41/00; F16K 11/076;
F16K 5/0642; F16K 11/087; F16K 5/08;
F16K 27/0263; F16K 27/0245; F16K
31/04; B62D 5/083; B62D 5/24; Y10T
137/86638; Y10T 137/5762; F02M
57/025; F02M 59/105; F02M 59/466;
F01L 1/46; F01L 9/10; F01L 13/06; F01P
2007/146; F01P 7/14; F01P 7/165; F01P
3/20; F01P 11/16; F01P 2060/045; F01P
2060/16; F01P 2060/18; F01P 2060/08;
F01P 2060/04; F01P 2037/02; F01P
2003/028; F01P 3/02; F01P 5/10; G01F
15/14; G01F 15/063; G01F 15/005; G01F
15/003; G01F 1/662; B60H 1/00485
USPC ........... 137/625.17, 625.16, 625.19, 625.21,
137/625.22, 625.23, 625.24, 625.31,
137/625.32, 565.26, 297, 625.43, 597,
137/625.11, 625.47, 454.6; 251/288
See application file for complete search history.

(56) References Cited

U.S. PATENT DOCUMENTS

| | | | | |
|---|---|---|---|---|
| 3,166,098 | A * | 1/1965 | Jennings | F16K 11/0873 |
| | | | | 251/367 |
| 3,674,052 | A * | 7/1972 | Hartman | F16K 5/08 |
| | | | | 137/625.21 |
| 3,684,241 | A * | 8/1972 | Hartmann | F16K 5/08 |
| | | | | 137/625.22 |
| 4,459,897 | A * | 7/1984 | Bacardit | B62D 5/083 |
| | | | | 137/625.21 |
| 5,259,233 | A * | 11/1993 | Brandt | G01N 33/0026 |
| | | | | 137/625.21 |
| 5,375,576 | A * | 12/1994 | Ausman | F02M 57/025 |
| | | | | 251/48 |
| 5,613,835 | A * | 3/1997 | Tyner | E03F 5/22 |
| | | | | 417/187 |
| 6,000,430 | A * | 12/1999 | Nafz | F16K 11/0876 |
| | | | | 137/625.11 |
| 6,196,266 | B1 * | 3/2001 | Breda | F16K 11/0853 |
| | | | | 137/454.6 |
| 6,223,772 | B1 * | 5/2001 | Cummings | F16K 51/02 |
| | | | | 251/267 |
| 6,279,539 | B1 * | 8/2001 | Graves | F02M 57/025 |
| | | | | 123/458 |
| 7,121,523 | B2 * | 10/2006 | Adams | F16K 31/004 |
| | | | | 251/119 |
| 7,228,826 | B2 * | 6/2007 | Chang | F01L 13/0015 |
| | | | | 251/12 |
| 7,506,664 | B2 * | 3/2009 | Norris | F16K 11/0876 |
| | | | | 137/625.42 |
| 7,874,771 | B2 * | 1/2011 | Ikuta | B23Q 11/0883 |
| | | | | 277/351 |
| 7,874,772 | B2 * | 1/2011 | Ikuta | B23Q 11/10 |
| | | | | 285/98 |
| 8,919,425 | B2 * | 12/2014 | Han | F16K 11/072 |
| | | | | 165/103 |
| 9,212,751 | B2 * | 12/2015 | McLane | F01P 7/165 |
| 9,863,545 | B2 * | 1/2018 | Kawamura | A47L 7/0057 |
| 9,932,882 | B2 * | 4/2018 | Imasaka | F01P 7/14 |
| 10,018,387 | B2 * | 7/2018 | Giles | F25B 41/26 |
| 10,066,751 | B2 * | 9/2018 | Seko | F16K 5/201 |
| 10,280,829 | B2 * | 5/2019 | Shen | F01P 7/165 |
| 10,295,066 | B2 * | 5/2019 | Kaczmar | F16K 31/041 |
| 10,295,076 | B2 * | 5/2019 | Russalian | F01P 7/16 |
| 10,465,806 | B2 * | 11/2019 | Feng | F16K 27/067 |
| 10,533,485 | B2 * | 1/2020 | Carter | F01P 11/20 |
| 10,591,069 | B2 * | 3/2020 | Russalian | F16K 5/0605 |
| 10,626,784 | B2 * | 4/2020 | Akase | F16K 25/005 |
| 10,830,625 | B2 * | 11/2020 | Skallebæk | F16K 27/041 |
| 11,073,216 | B2 * | 7/2021 | Kondo | F16K 11/0876 |
| 11,098,807 | B2 * | 8/2021 | Suzuki | F16K 11/076 |
| 11,168,797 | B2 * | 11/2021 | Dragojlov | F16K 31/535 |
| 11,255,450 | B2 * | 2/2022 | Ledvora | F16K 11/0856 |
| 11,261,799 | B2 * | 3/2022 | Pollock | F04D 27/023 |
| 11,285,778 | B2 * | 3/2022 | Kanzaki | F01P 7/14 |
| 11,333,258 | B2 * | 5/2022 | Sato | F16K 31/535 |
| 11,441,690 | B2 * | 9/2022 | Maruyama | F16K 11/076 |
| 11,473,956 | B2 * | 10/2022 | Rømer | G01F 15/14 |
| 11,629,791 | B2 * | 4/2023 | Dragojlov | F16K 31/535 |
| | | | | 137/625 |
| 11,719,350 | B2 * | 8/2023 | Dragojlov | F16K 11/0876 |
| | | | | 137/625.19 |
| 11,724,561 | B2 * | 8/2023 | Spies | B60H 1/00485 |
| | | | | 137/625 |
| 11,852,263 | B2 * | 12/2023 | Geng | F16K 5/12 |
| 11,892,095 | B2 * | 2/2024 | Hamada | F16K 5/184 |
| 12,222,041 | B2 * | 2/2025 | Plaeru | F16K 27/067 |
| 2008/0006328 | A1 * | 1/2008 | Denike | F16K 1/221 |
| | | | | 137/312 |
| 2013/0048896 | A1 * | 2/2013 | Stern | F16K 31/408 |
| | | | | 251/324 |
| 2019/0063623 | A1 * | 2/2019 | Dragojlov | F16K 11/0876 |
| 2020/0109787 | A1 * | 4/2020 | Tsuji | F16K 27/067 |
| 2023/0078460 | A1 * | 3/2023 | MacNally | F16K 5/0605 |
| | | | | 137/625.47 |
| 2023/0175600 | A1 * | 6/2023 | Ishiguchi | F01P 7/165 |
| | | | | 236/12.11 |

* cited by examiner

CONTROL VALVE AND COOLING SYSTEM FOR VEHICLE INCLUDING THE SAME

CROSS REFERENCE TO RELATED APPLICATIONS

This application claims priority to and the benefit of Korean Patent Application No. 10-2022-0133738 filed in the Korean Intellectual Property Office on Oct. 18, 2022, the entire contents of which are incorporated herein by reference.

BACKGROUND

(a) Field

The present disclosure relates to a control valve and a cooling system for a vehicle including the same.

(b) Description of the Related Art

In general, an engine exhausts heat energy while generating torque necessary for driving the vehicle from combustion of fuel for driving, and a coolant absorbs the heat energy while circulating through the engine, a heater, and a radiator, and emits the absorbed heat energy to the outside.

When a coolant temperature of the engine is excessively high, knocking occurs, and thus ignition timing needs to be adjusted to suppress occurrence of knocking, thereby causing deterioration of engine performance, and when a lubricant temperature is too high, viscosity becomes low, thereby causing deterioration of lubrication performance.

On the contrary, when a coolant temperature of the engine is excessively low, oil viscosity is increased and thus frictional force is increased, fuel consumption is increased, a temperature of exhaust gas is slowly increased and thus time to activate a catalyst is increased, and quality of exhaust gas is deteriorated. In addition, time taken for normalizing the heater is extended, thereby causing inconvenience to a driver or an occupant.

In particular, since viscosity of engine oil is increased when the engine is started in a cold condition such as a winter season, engine output and efficiency are deteriorated, thereby causing deterioration of fuel efficiency. Further, since incomplete combustion of fuel occurs when a temperature of the combustion chamber is low, exhaust gas may be excessively discharged.

Thus, a control valve is applied to control several cooling elements, by which, for example, the temperature of the coolant in a particular portion is maintained to be high and the temperature of the coolant in another portion is maintained to be low.

In other words, research is being conducted on a technology in which one control valve controls each coolant passing through the radiator, the heater, a chiller, an oil cooler, or the engine, and research is underway to simplify the configuration of the control valve to simplify the layout of a cooling system and to optimize an opening strategy of the control valve.

In addition, as element technologies of the vehicle's cooling system increases, the complexity of the cooling system increases, and accordingly, the layout of the cooling system is also complicated. An effect of the element technology of each cooling system overlaps with that of an element technology of other cooling systems, and there are cases in which a targeted effect cannot be obtained. Therefore, research to realize the optimization of functional elements including the layout of the cooling system is essential.

The above information disclosed in this Background section is only for enhancement of understanding of the background of the disclosure and therefore it may contain information that does not form the prior art that is already known in this country to a person of ordinary skill in the art.

SUMMARY

The present disclosure attempts to provide a control valve and a cooling system for a vehicle including the same, having advantage of simplified configuration of the control valve and thereby simplified layout of a cooling system applied to a vehicle.

A control valve includes a valve housing, a first inlet port and a second inlet port that are formed on the valve housing and through which a coolant is drawn, a first outlet port and a second outlet port that are formed on the valve housing and through which the coolant is discharged, and a ball valve rotatably disposed within the valve housing, and configured to fluidically communicate the first inlet port and the first outlet port and fluidically communicate the second inlet port and the second outlet port, or fluidically communicate the first inlet port and the second outlet port and fluidically communicate the second inlet port and the first outlet port.

The ball valve may include a valve body formed in an a partially spherical shape, a rotation shaft extending from the valve body, a first port, a second port, and a third port formed on a side surface of the valve body, a fourth port formed on an upper surface of the valve body, a first connection line fluidically connect the first port and the second port, and a second connection line fluidically connect the third port and the fourth port, where the first connection line fluidically connects the first inlet port and the first outlet port, or fluidically connects the second inlet port and the first outlet port, where the second connection line fluidically connects the first inlet port and the second outlet port, or fluidically connects the second inlet port and the second outlet port.

The first connection line may be spaced apart from the rotation shaft in a radial direction by a preset interval, and formed along the radial direction from a first side surface to a second the side surface of the valve body.

The second connection line may be formed from the side surface of the valve body toward the upper surface of the valve body.

A stopper protrusion may be formed on a lower surface of the valve body.

The first port to the third port may be disposed around the rotation shaft to form an obtuse angle with respect to each other.

The control valve may further include an adapter coupled to the valve housing and formed with a penetration hole through which the rotation shaft of the ball valve penetrates, a driving unit housing disposed in a lower portion of the adapter, and a driving unit provided in an interior of the driving unit housing, coupled to the rotation shaft, and configured to provide power to rotate the ball valve.

The control valve may further include at least one drain chamber formed on an upper surface of the driving unit housing, and at least one drain line formed on the upper surface of the driving unit housing and fluidically communicating with the drain chamber.

The drain chamber may be formed in a plural quantity around the rotation shaft along a circumferential direction.

At least one bypass chamber corresponding to the drain chamber may be formed on a lower surface of the adapter.

A limiter that the stopper protrusion for may selectively contacts may be formed in the adapter in order to limit rotation of the ball valve.

The control valve may further include an integrated electric water pump configured to pump the coolant discharged through the second outlet port.

A cooling system for a vehicle includes the above control valve, and includes a first cooling line through which the coolant flows and on which a battery, a heater, and a chiller may be disposed, and a second cooling line through which the coolant flows and on which a condenser, a radiator, a reservoir tank, and an electric water pump may be disposed, where the control valve is disposed between the first cooling line and the second cooling line, and where depending on an operation of the control valve, the first cooling line and the second cooling line are fluidically connected, or the first cooling line and the second cooling line are fluidically separated.

According to a control valve and a cooling system for a vehicle including the same according to an embodiment, the configuration of the control valve is simplified and thereby the layout of a cooling system applied to a vehicle is also simplified, thereby achieving reduction of manufacturing costs.

In addition, by modularizing the integrated electric water pump into the control valve, an entire layout of a cooling system for a vehicle may be down-sized and simplified.

BRIEF DESCRIPTION OF THE FIGURES

These drawings are for reference only in describing embodiments of the present disclosure, and therefore, the technical idea of the present disclosure should not be limited to the accompanying drawings.

DETAILED DESCRIPTION

Figure 1:
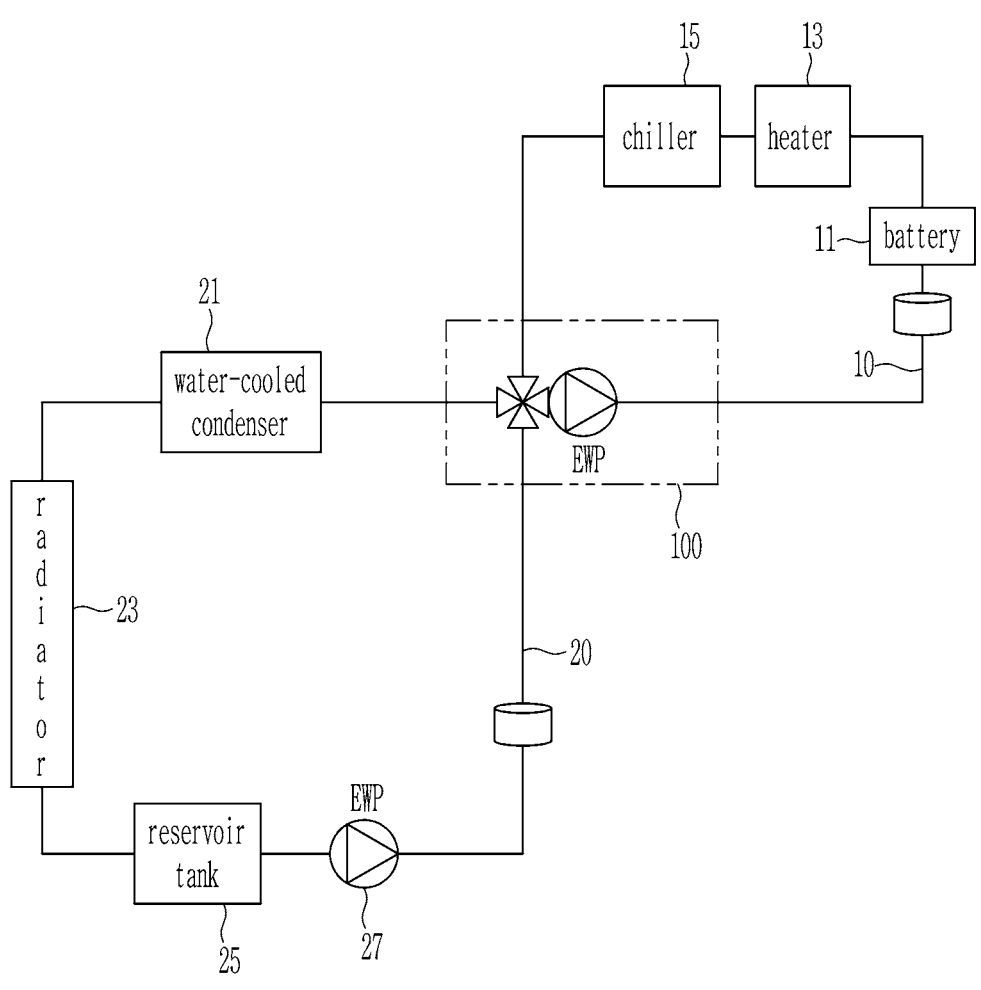
FIG. 1 is a schematic diagram showing a configuration of a cooling system for a vehicle applied with a control valve according to an embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Since the size and the thickness of each configuration shown in the drawings are arbitrarily indicated for better understanding and ease of description, the present disclosure is not limited to shown drawings, and the thickness of layers, films, panels, regions, etc., are exaggerated for clarity.

The terms "module" and "unit" for components used in the following description are used only in order to make the specification easier. Therefore, these terms do not have meanings or roles that distinguish them from each other by themselves.

In describing embodiments of the present specification, when it is determined that a detailed description of the well-known art associated with the present disclosure may obscure the gist of the present disclosure, it will be omitted.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not interpreted as limiting these components.

As used herein, the singular forms "a", "an" and "the" are intended to include the plural forms as well, unless the context clearly indicates otherwise.

The terms are only used to differentiate one component from others.

It is to be understood that when one component is referred to as being "connected" or "coupled" to another component, it may be connected or coupled directly to another component or be connected or coupled to another component with the other component intervening therebetween.

On the other hand, it is to be understood that when one component is referred to as being "connected or coupled directly" to another component, it may be connected or coupled to another component without the other component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

Hereinafter, a control valve 100 applied to a cooling system for a vehicle according to an embodiment is described in detail with reference to the drawings.

First, a cooling system for a vehicle to which the control valve 100 according to an embodiment is applied is first described.

FIG. 1 is a schematic diagram showing a configuration of a cooling system for a vehicle applied with a control valve according to an embodiment.

As shown in FIG. 1, a cooling system for a vehicle according to an embodiment includes a first cooling line 10 and a second cooling line 20 through which a coolant circulates.

The cooling system further includes a battery 11 through which the coolant circulates, a heater 12 for heating the coolant, and a chiller 13 for cooling the coolant may be provided on the first cooling line 10. In addition, an electric water pump 27, a condenser 21, a radiator 23, and a reservoir tank 25 may be provided on the second cooling line 20 through which the coolant circulates.

The control valve 100 according to an embodiment is installed between the first cooling line 10 and the second cooling line 20, and depending on an operation of the control valve 100, the first cooling line 10 and the second cooling line 20 may be fluidically separated, or fluidically connected.

The control valve 100 according to an embodiment may be operated by a control signal of a controller. Here, the controller may be implemented as at least one microprocessor operated by a predetermined program which may include a series of commands for carrying out a method in accordance with a preferred embodiment of the present disclosure.

The control valve 100 is fluidically connected to a first end portion and a second end portion of the first cooling line 10, and to a first end portion and a second end portion of the second cooling line 20*j*, respectively.

Hereinafter, the control valve 100 according to an embodiment is described with reference to the drawings.

Figure 2:
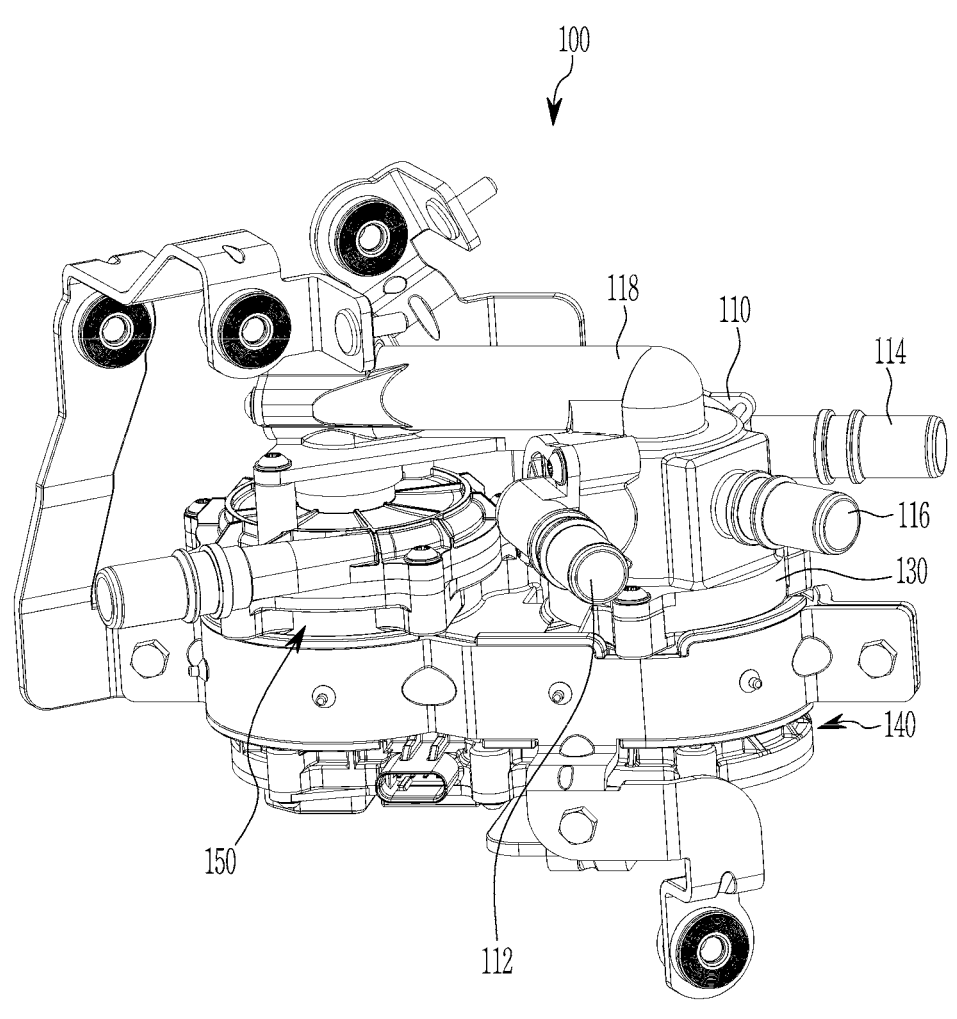
FIG. 2 and FIG. 3 are a perspective view showing a configuration of a control valve according to an embodiment, respectively.
Figure 3:
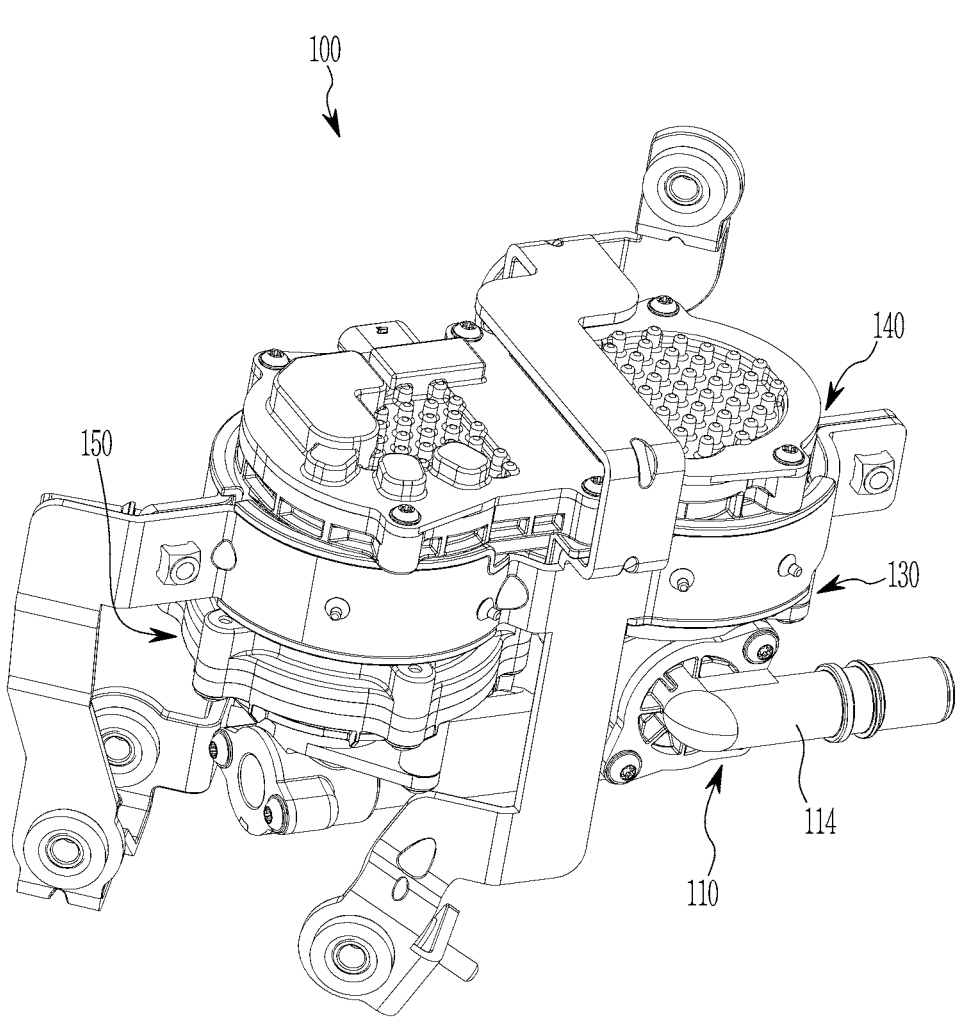
Figure 4:
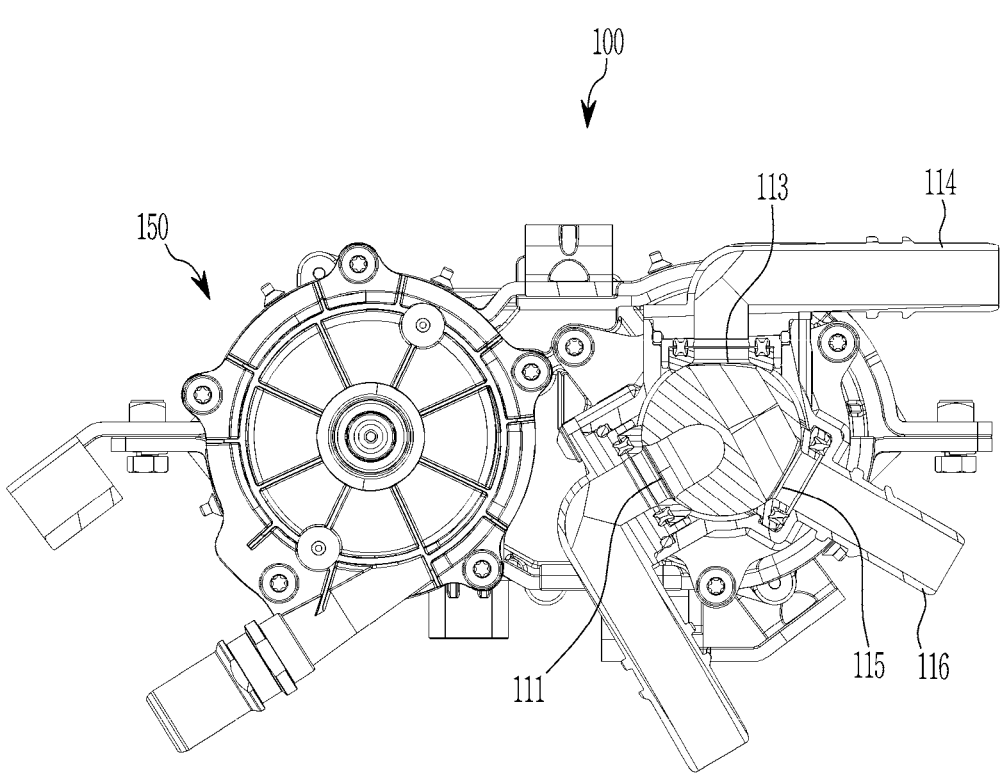
FIG. 4 is a top plan view showing a configuration of a control valve according to an embodiment.
Figure 5:
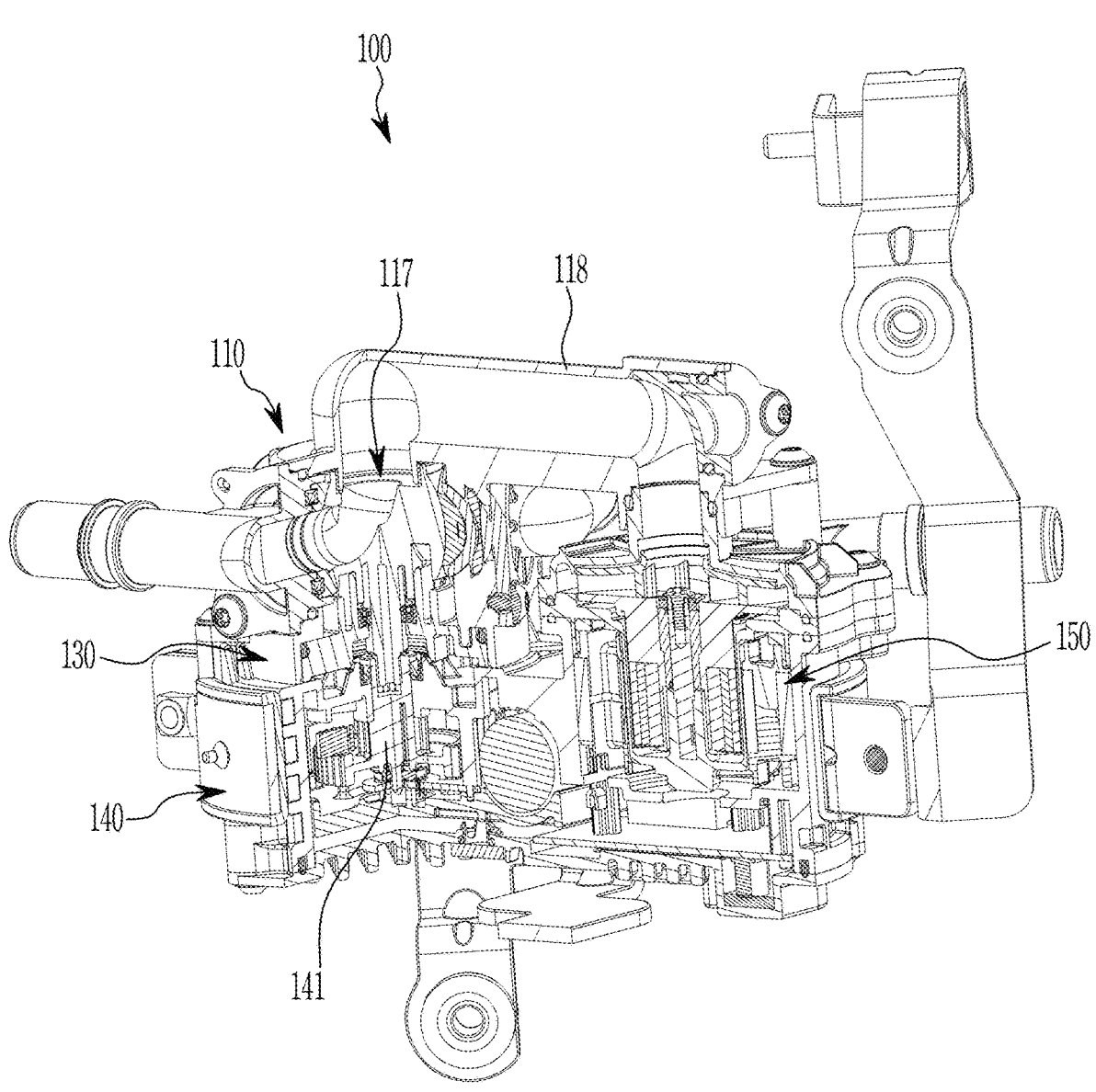
FIG. 5 is a perspective view in which a part of a control valve according to an embodiment is cut away.
Figure 6:
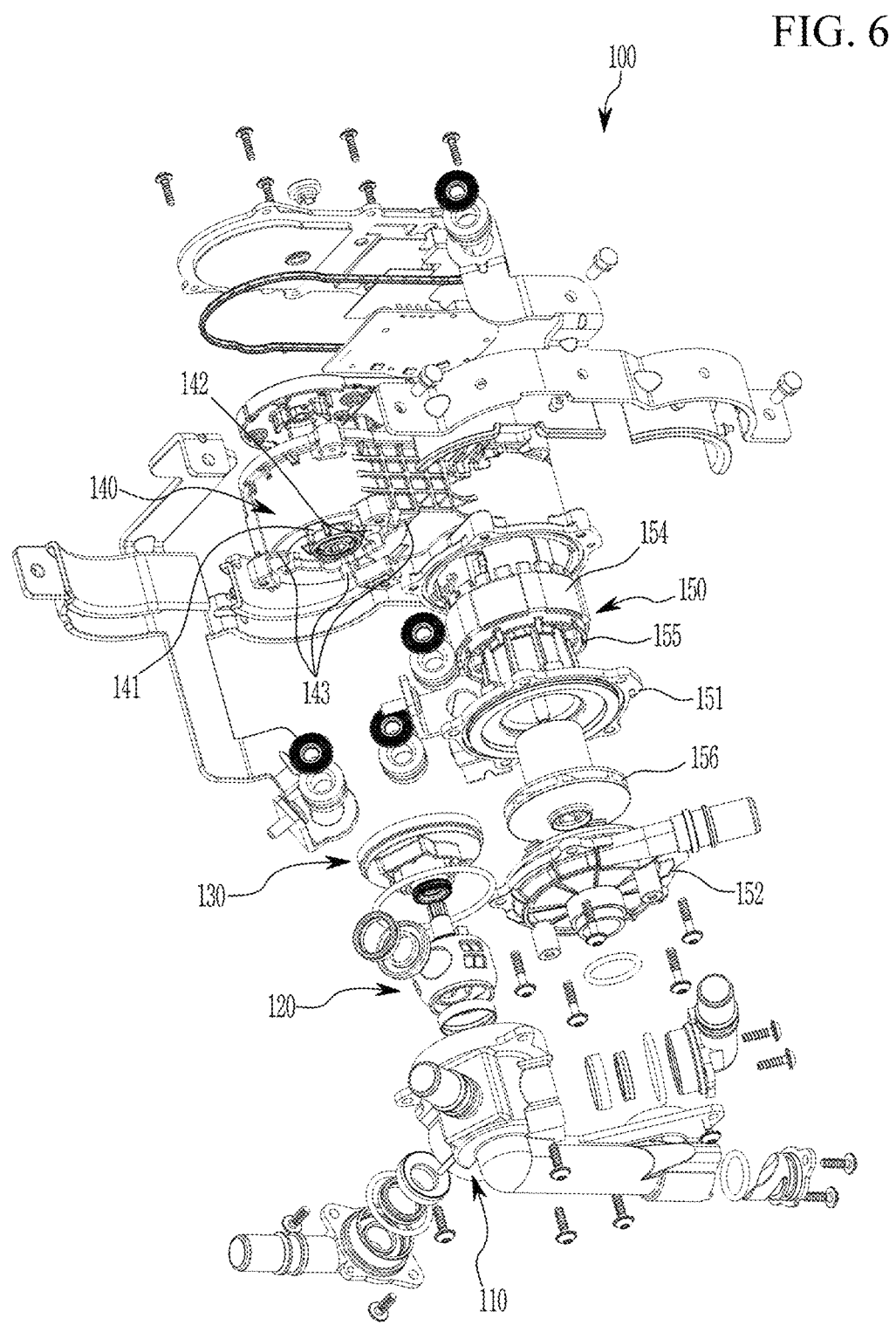
FIG. 6 is an exploded perspective view showing a configuration of a control valve according to an embodiment.

FIG. 2 and FIG. 3 are a perspective view showing a configuration of a control valve according to an embodiment, respectively. FIG. 4 is a top plan view showing a configuration of a control valve according to an embodiment. FIG. 5 is a perspective view in which a part of a control valve according to an embodiment is cut away. FIG. 6 is an exploded perspective view showing a configuration of a control valve according to an embodiment.

As shown in FIG. 2 to FIG. 6, the control valve 100 according to an embodiment may include a valve housing 110 in which a ball valve 120 is installed, an adapter 130, a driving unit housing 140 in which a driving unit 141 is installed, and an integrated electric water pump 150.

The ball valve 120 is provided in an interior of the valve housing 110, and a first inlet port 111 and a second inlet port 113 through which the coolant is drawn, and a first outlet port 115 and a second outlet port 117 through which the coolant is discharged are formed on the valve housing 120.

A first inlet pipe 112 is formed on and extends from the first inlet port 111, a second inlet pipe 114 is formed on and extends from the second inlet port 113, a first outlet pipe 116 is formed on and extends from the first outlet port 115, and a second outlet pipe 118 is formed on and extends from the second outlet port 117.

The first inlet pipe 112 is formed in a generally "L" shape bent in a lateral side, the second inlet pipe 114 is formed in a generally straight line, the first outlet pipe 116 is formed in a generally "L" shape bent in a lateral side, and the second outlet pipe 118 is formed in a generally "L" shape bent upward.

The ball valve 120 is rotatably disposed within the valve housing 110. As rotating within the valve housing 110, the ball valve 120 may fluidically communicate the first inlet port 111 and the first outlet port 115 and fluidically communicate the second inlet port 113 and the second outlet port 117. Alternatively, as rotating within the valve housing 110, the ball valve 120 may fluidically communicate the first inlet port 111 and the second outlet port 117 and fluidically communicate the second inlet port 113 and the first outlet port 115.

Hereinafter, the configuration of the ball valve 120 according to an embodiment is described in detail with reference to the drawing.

Figure 7:
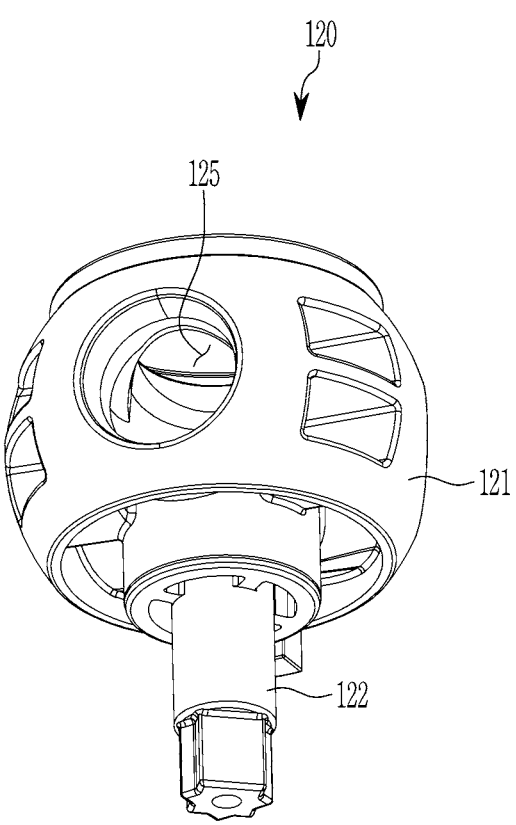
FIG. 7 and FIG. 8 are a perspective view showing a configuration of ball valve according to an embodiment, respectively.
Figure 8:
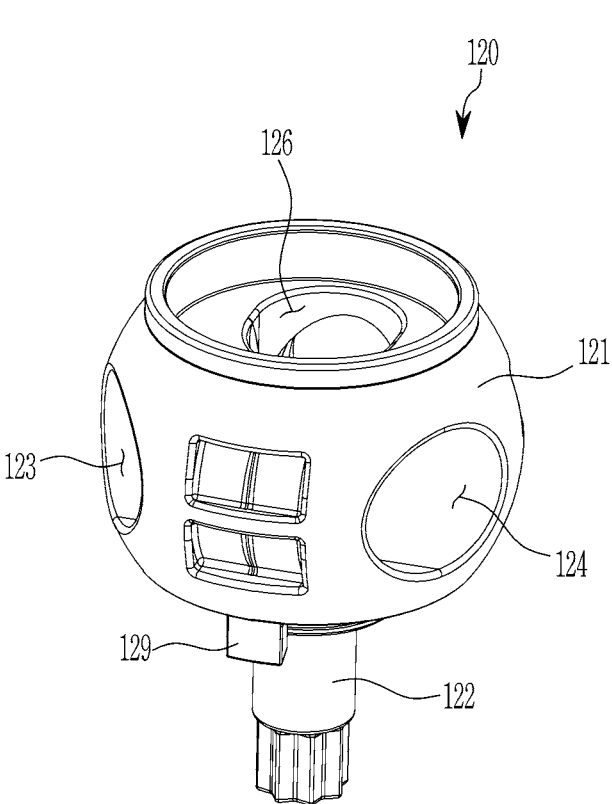
Figure 9:
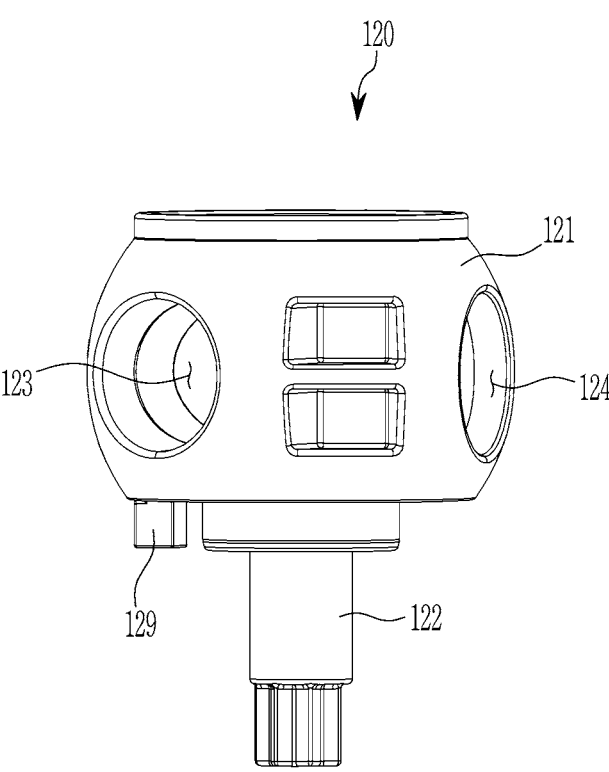
FIG. 9 is a side view showing a configuration of ball valve according to an embodiment.
Figure 10:
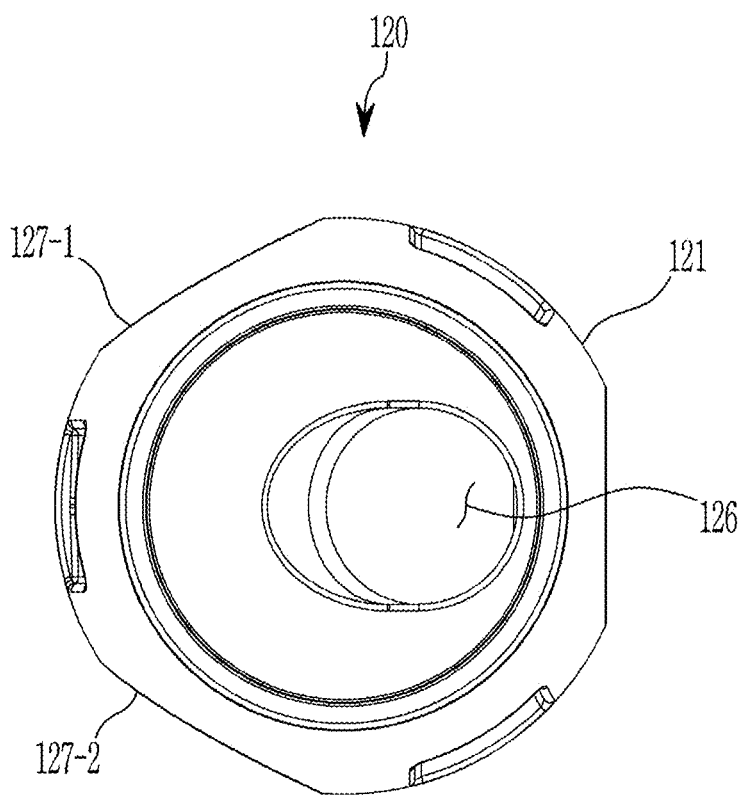
FIG. 10 is a top plan view showing a configuration of ball valve according to an embodiment.
Figure 11:
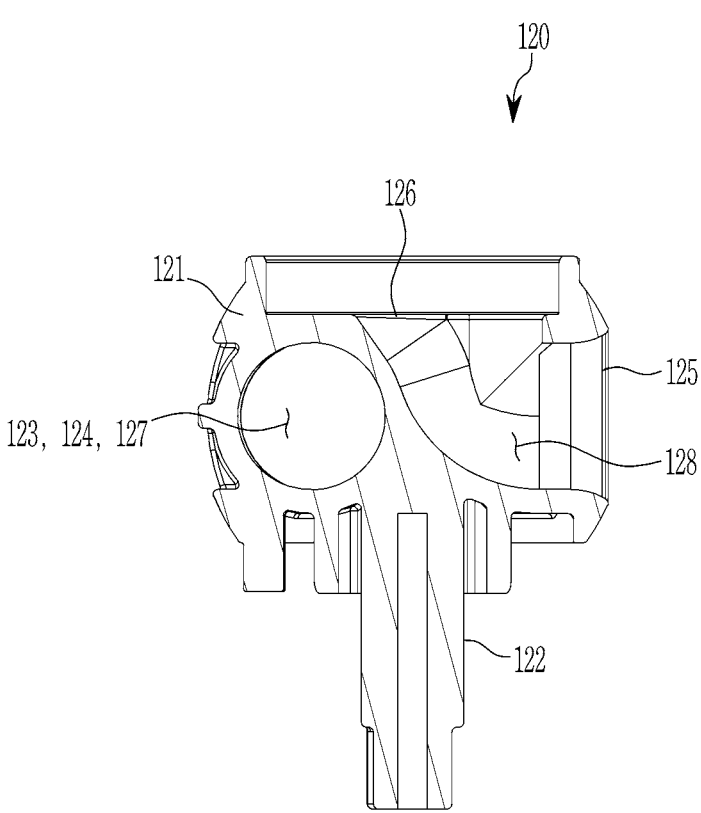
FIG. 11 and FIG. 12 is a cross-sectional view showing a configuration of ball valve according to an embodiment.
Figure 12:
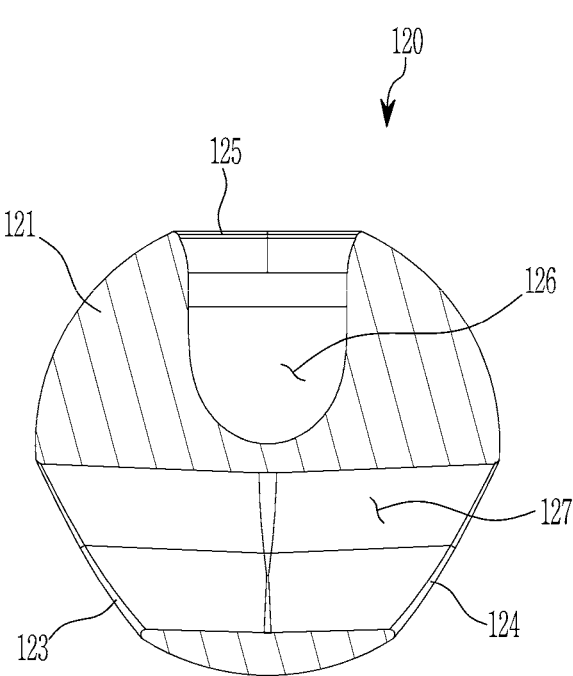

FIG. 7 and FIG. 8 are a perspective view showing a configuration of ball valve according to an embodiment, respectively. FIG. 9 is a side view showing a configuration of ball valve according to an embodiment. FIG. 10 is a top plan view showing a configuration of ball valve according to an embodiment. FIG. 11 and FIG. 12 is a cross-sectional view showing a configuration of ball valve according to an embodiment.

Referring to FIG. 7 to FIG. 12, the ball valve 120 may include a valve body 121 formed in an at least partially spherical shape, and a rotation shaft 122 extending from the valve body 121.

The valve body 121 is formed in a partially spherical shape that may be split into a first end and a second end (e.g., an upper portion and a lower portion), and a lower portion of the rotation shaft 122 is formed to extend downward from the valve body 121. The valve body 121 is formed in a partially spherical shape with one end and the other end (e.g., upper and lower portions) cut out, and a rotational shaft 122 extends downward at the lower portion of the valve body 121.

A first port 123, a second port 124, and a third port 125 are formed on a side surface of the valve body 121, and a fourth port 126 is formed on an upper surface of the valve body 121.

The first port 123 and the second port 124 are fluidically connected through a first connection line 127, and the third port 125 and the fourth port 126 are fluidically connected through a second connection line 128. The first connection line 127 fluidically connects the first inlet port 111 and the first outlet port 115, or fluidically connects the second inlet port 113 and the first outlet port 115. In addition, the second connection line 128 fluidically connects the first inlet port 111 and the second outlet port 117, or fluidically connects the second inlet port 113 and the second outlet port 117.

The first connection line 127 is spaced apart from the rotation shaft 122 in a radial direction by a preset interval, and formed along the radial direction from a first side surface 127-1 to a second the side surface 127-2 of the valve body 121. In addition, the second connection line 128 is formed from the side surface of the valve body 121 toward the upper surface of the valve body 121. The second connection line 128 is formed in a generally "L" shape, and formed to be round in order to decrease abrupt resistance to the coolant flow. The first connection line 127 and the second connection line 128 are formed to prevent interference therebetween.

The first port 123 to the third port 125 are disposed to form an obtuse angle with respect to each other around the rotation shaft 122. For example, the first port 123 to the third port 125 may be disposed around the rotation shaft 122 at an interval of 120 degrees along a circumferential direction. As such, since the first port 123 to the third port 125 are disposed to form an obtuse angle around the rotation shaft 122, resistance to the flow of the coolant may be decreased when the coolant drawn through the first inlet port 111 or the second inlet port 113 of the valve housing 110 is discharged to the first outlet port 115 of the valve housing 110 through the first connection line 127 of the ball valve 120.

Meanwhile, a stopper protrusion 129 is formed on a lower surface of the ball valve 120 to extend downward. The stopper protrusion 129 of the ball valve 120 selectively contacts a later-described limiter 133 of the adapter 130, to limit a rotation range of the ball valve 120.

Referring back to FIG. 2 to FIG. 6, the control valve 100 according to an embodiment may further include the adapter 130 coupled to the valve housing 110.

Figure 13:
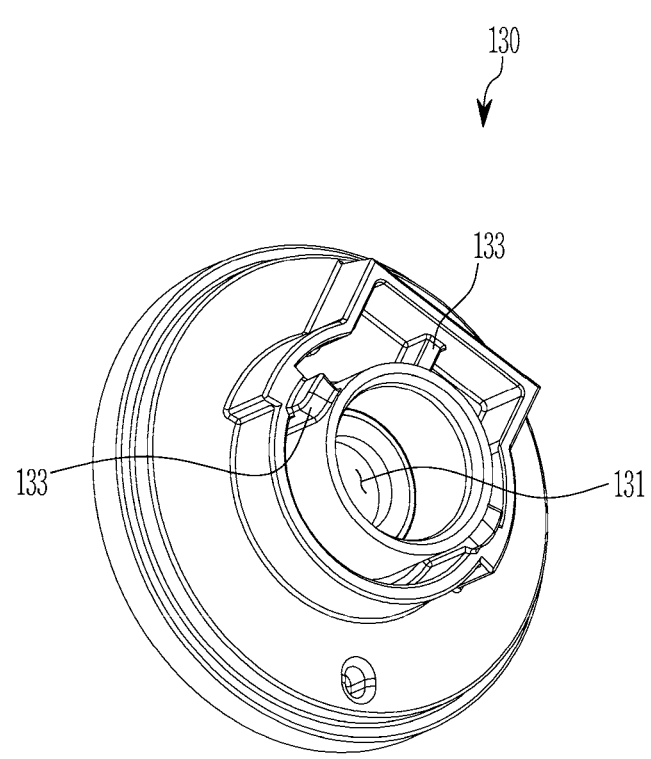
FIG. 13 and FIG. 14 is a perspective view showing a configuration of adapter according to an embodiment.
Figure 14:
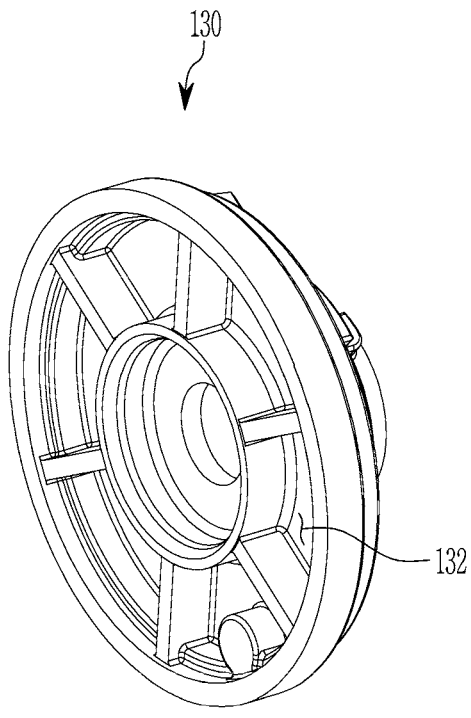

Referring to FIG. 13 and FIG. 14, the adapter 130 is formed in a generally disc shape, and is coupled to the valve housing 110 at a lower portion of the valve housing 110.

A penetration hole 131 through which the rotation shaft 122 of the ball valve 120 penetrates is formed at a center of the adapter 130. In an upper portion of the adapter 130, a seating protrusion on which the lower surface of the ball valve 120 is seated is formed on an exterior circumference of the penetration hole 131, and a sealing for preventing leakage of the coolant may be disposed in an interior lower surface of the seating protrusion.

Figure 15:
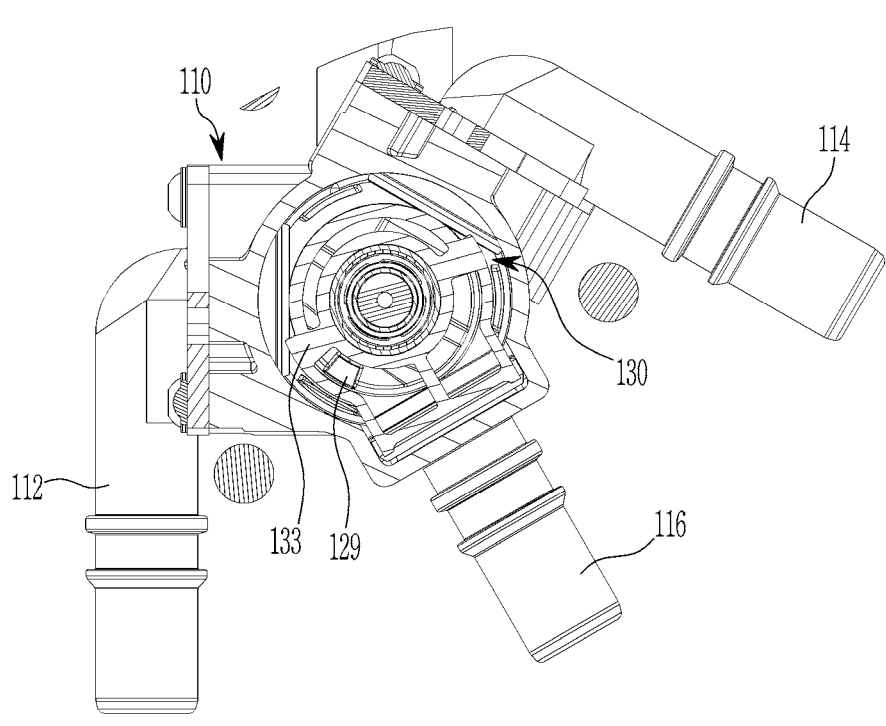
FIG. 15 is a partially cut-away plan view of an adapter and a driving unit housing according to an embodiment.

The limiter 133 that the above-described stopper protrusion selectively contacts is formed on an exterior circumference of the seating protrusion of the adapter 130. The limiter 133 may be formed on and protrude from the exterior circumference of the seating protrusion. As the stopper protrusion of the ball valve 120 contacts the limiter 133 of the seating protrusion, the rotation range of the ball valve 120 is limited, and thereby malfunctioning of the ball valve 120 may be prevented (refer to FIG. 15).

A bypass chamber 132 formed in a concave shape may be formed in a lower portion of the adapter 130. The bypass chamber 132 may be formed in a plural quantity (e.g., six) around the penetration hole 131 along a circumferential direction. The bypass chamber 132 may be formed corresponding to a drain chamber 142 of the driving unit housing 140 that is later described.

Referring back to FIG. 2 to FIG. 6, the control valve 100 according to an embodiment may further include the driving unit housing 140 accommodating the driving unit 141.

The driving unit housing 140 is disposed in the lower portion of the adapter 130, the driving unit 141 provided in an interior of the driving unit housing 140 is coupled to the rotation shaft 122 of the rotation shaft 122 the ball valve 120 to provide power for rotating the ball valve 120. The driving unit 141 may be realized as an electric motor, but is not limited thereto.

Figure 16:
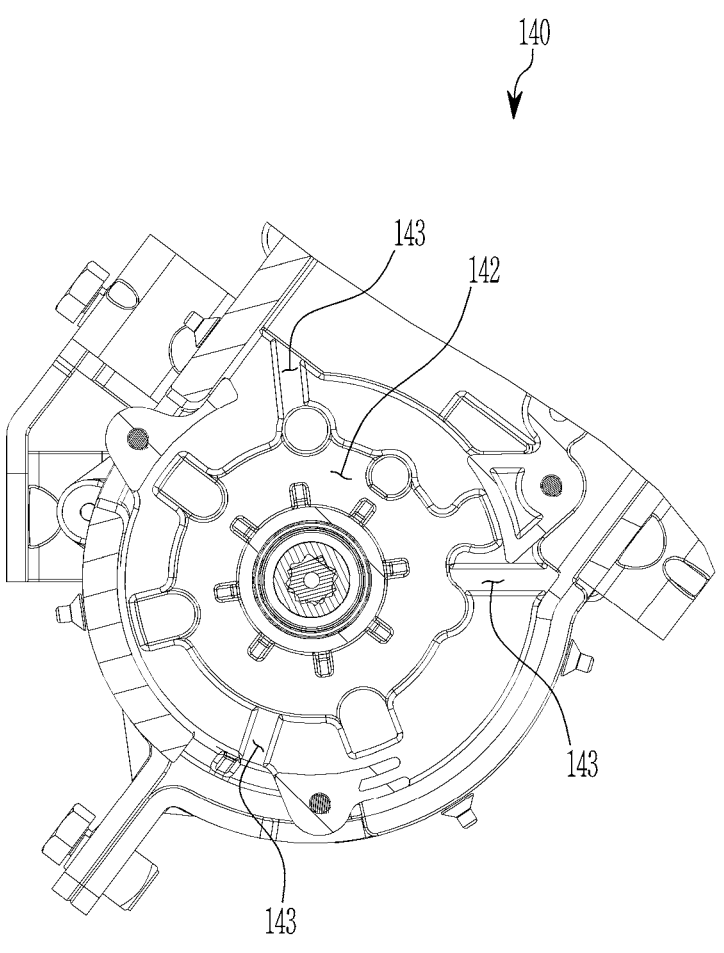
FIG. 16 is a top plan view showing a configuration of driving unit housing according to an embodiment.

Referring to FIG. 16, at least one drain chamber 142, and at least one a drain line 143 fluidically communicating with the drain chamber 142 are formed in an upper surface of the driving unit housing 140 facing the adapter 130.

The drain chamber 142 is formed in an upper portion of the driving unit housing 140, in a concave shape around the rotation shaft 122 of the ball valve 120 corresponding to the bypass chamber 132 formed on the adapter 130. In addition, the drain line 143 fluidically communicates with the drain chamber 142, and discharged the coolant accumulated in the drain chamber 142 to the outside through a side surface of the driving unit housing 140. The drain passage 143 fluidically communicates with the drain chamber 142 and discharges the coolant accumulated in the drain chamber 142 to the outside through the side of the driving unit housing 140.

In an embodiment, the rotation shaft 122 of the ball valve 120 is coupled to a driving unit 141 (e.g., an electric motor)

through the adapter 130 and the driving unit housing 140. Although the sealing of the ball valve 120 is disposed between the rotation shaft 122 and the adapter 130 to prevent the leakage of the coolant, a small amount of coolant may leak through the penetration hole 131 of the adapter 130. At this time, the coolant leaking through the penetration hole 131 of the adapter 130 is temporarily stored in the drain chamber 142 of the driving unit housing 140, and is discharged to the exterior of the driving unit housing 140 through the drain line 143 when the leaked amount of the coolant exceeds the capacity of the drain chamber 142. Each of the drain lines 143 being of different lenghts in order to reach the exterior of the driving unit housing 140. As such, since the coolant leaking through the penetration hole 131 of the adapter 130 is discharged to the exterior of the driving unit housing 140 through the drain chamber 142 and the drain line, the coolant flowing into the driving unit housing 140 is minimized, and thereby, electrical/electronic component parts (e.g., an electric motor, a circuit, and the like) provided within the driving unit housing 140 may be prevented from being damaged.

Referring back to FIG. 2 to FIG. 6, the control valve 100 according to an embodiment may further include the integrated electric water pump 150 configured to pump the coolant discharged through the first outlet port 115.

The integrated electric water pump may include a pump housing 151, a pump cover 152, and a pump motor 153 and an impeller 156 provided in an interior of the pump housing 151. The pump motor 153 may include a stator 154 and a rotor 155. The pump housing 151 and the valve housing 110 are assembled (e.g., by a bolt or the like), such that an integrated electric water pump may be accommodated in the control valve.

Various component parts (e.g., the stator 154, the rotor 155, the impeller 156, and the like) for forming the integrated electric water pump 150 are installed in the pump housing 151.

The pump cover 152 is coupled to an upper portion of the pump housing 151, and a pump inlet pipe fluidically connected to the second outlet pipe 118 and a pump outlet pipe through which the coolant pumped by the impeller 156 is discharged are formed on the pump cover 152. That is, the coolant drawn through the pump inlet pipe is pumped by the impeller 156 provided in an interior of the pump housing 151, and thereby discharged through the pump outlet pipe.

Depending on a rotation of the ball valve 120, the control valve 100 according to an embodiment may be operated in a first mode (or an integrated mode) and a second mode (or a separated mode).

Figure 17:
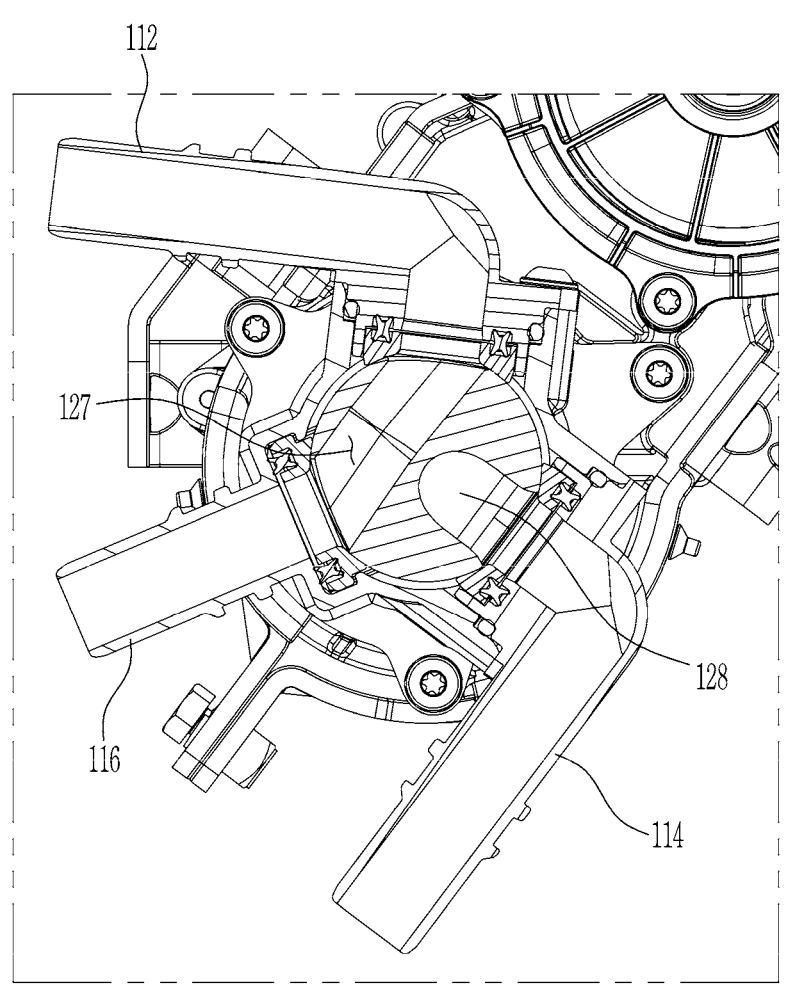
FIG. 17 and FIG. 18 are drawings for showing an operation in a first mode of a control valve according to an embodiment.
Figure 18:
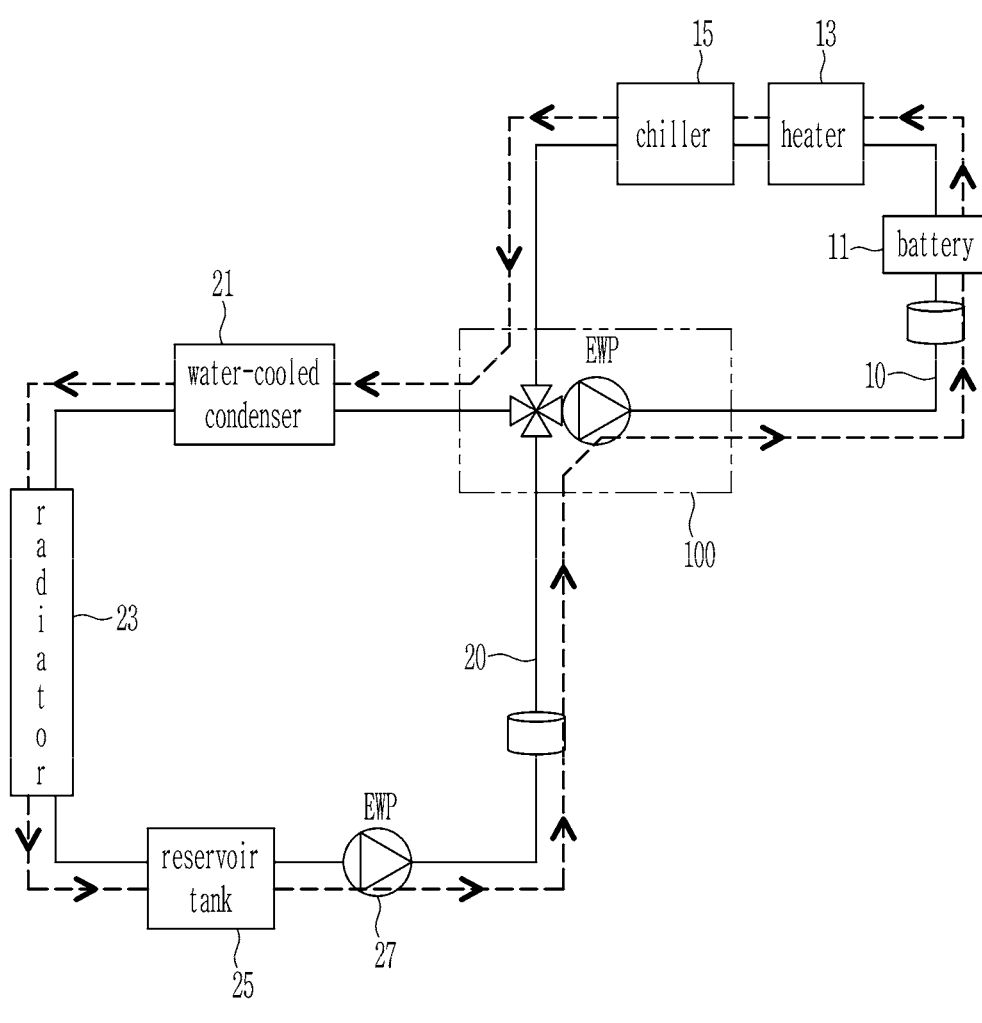
Figure 19:
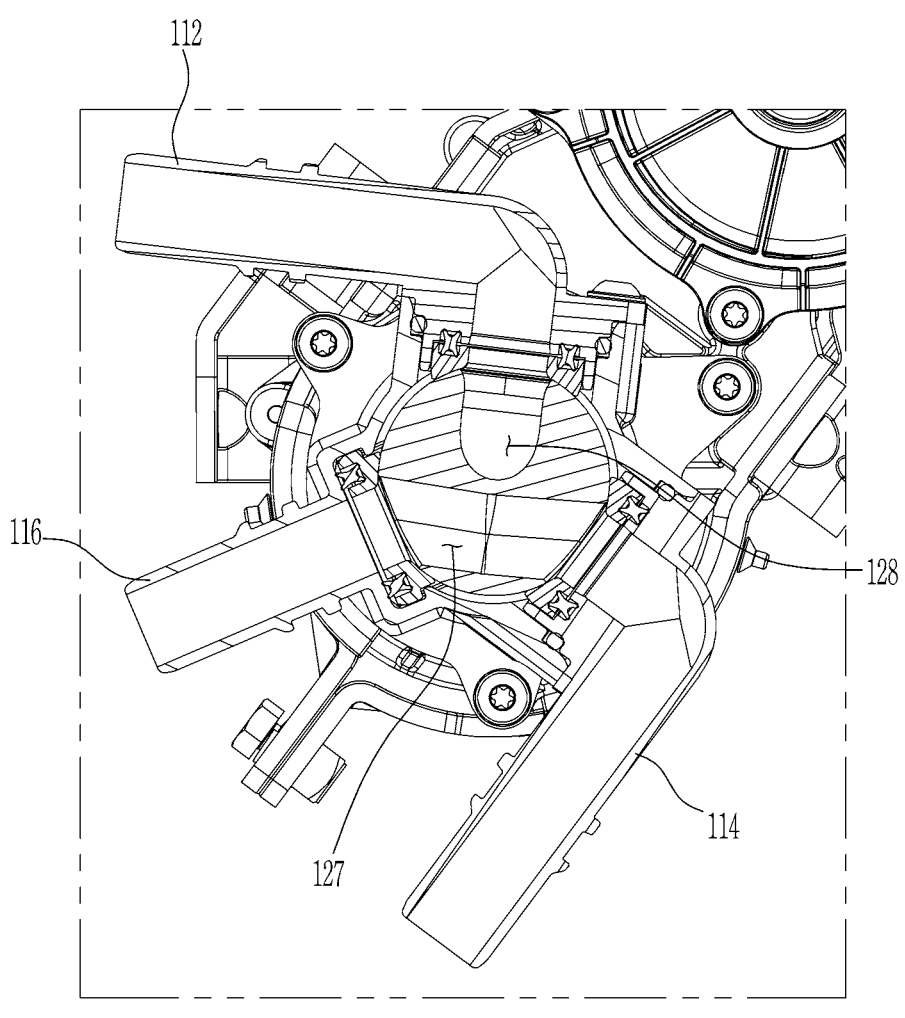
FIG. 19 and FIG. 20 are drawings for showing an operation in a second mode of a control valve according to an embodiment.
Figure 20:
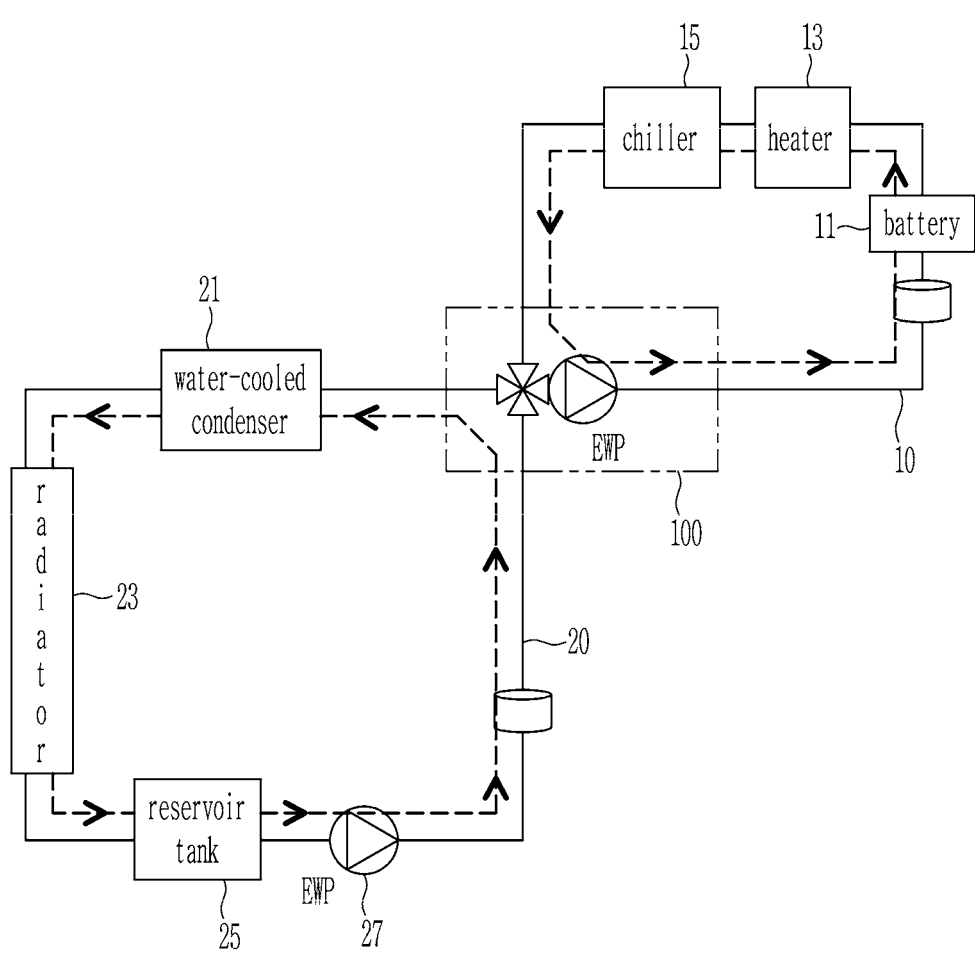

Referring to FIG. 17 and FIG. 18, the first mode is a mode in which the first cooling line 10 and the second cooling line 20 are fluidically connected to each other.

In the first mode, as the ball valve 120 of the control valve 100 rotates in one direction (e.g., clockwise), the first inlet port 111 and the first outlet port 115 fluidically communicate, and the second inlet port 113 and the second outlet port 117 fluidically communicate.

Accordingly, the coolant having passed through the battery 11, the heater 12, and the chiller 13 disposed on the first cooling line 10 flows into the second cooling line 20 through the control valve 100.

At this time, in the control valve 100, the first inlet port 111 and the first outlet port 115 fluidically communicate, and the second inlet port 113 and the second outlet port 117 fluidically communicate.

Therefore, the coolant drawn into the control valve 100 from the first cooling line 10 is discharged to the first outlet pipe 116 through the first inlet pipe 112 and the first connection line 127 of the ball valve 120, and thereafter, is drawn into the second cooling line 20.

The coolant drawn into the second cooling line 20 passes through the condenser 21, the radiator 23, and the reservoir tank 25 that are disposed on the second cooling line 20, and then pumped by the electric water pump 27 to flow back to the control valve 100.

The coolant flowing back to the control valve 100 is discharged to the second outlet pipe 118 through the second inlet pipe 114 and the second connection line 128 of the ball valve 120, and by being further pumped by the integrated electric water pump 150, flows back to the first cooling line 10.

Referring to FIG. 18, the second mode is a mode in which the first cooling line 10 and the second cooling line 20 are fluidically separated. In the second mode, as the ball valve 120 of the control valve 100 rotates in another direction (e.g., anticlockwise), the first inlet port 111 and the second outlet port 117 are fluidically connected, and the second inlet port 113 and the first outlet port 115 fluidically communicate.

Accordingly, the coolant having passed through the battery 11, the heater 12, and the chiller 13 disposed on the first cooling line 10 circulates back to the first cooling line 10 by the control valve 100.

That is, the coolant having passed through the battery 11, the heater 12, and the chiller 13 disposed on the first cooling line 10 is discharged to the second outlet pipe 118 through the first inlet pipe 112 of the control valve 100 and the second connection line 128 of the ball valve 120, and by being pumped by the integrated electric water pump 150, flows back into the first cooling line 10.

In addition, the coolant having passed through the condenser 21, the radiator 23, and the reservoir tank 25 disposed on the second cooling line 20 circulates back to the second cooling line 20 by the control valve 100.

That is, the coolant having passed through the condenser 21, the radiator 23, and the reservoir tank 25 disposed on the second cooling line 20 is discharged to the first outlet pipe 116 through the second inlet pipe 114 of the control valve 100 and the first connection line 127 of the ball valve 120, and thereafter, flows back into the second cooling line 20.

According to the control valve 100 and a cooling system including the same according to an embodiment, the configuration of the control valve 100 disposed between the first cooling line 10 and the second cooling line 20 may be streamlined, and thereby manufacturing costs for a cooling system for a vehicle may be decreased.

In addition, by modularizing the integrated electric water pump 150 into the control valve 100, an entire layout of a cooling system for a vehicle may be down-sized and simplified.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

The invention claimed is:

1. A control valve, comprising:
a valve housing;
a first inlet port on the valve housing and through which a coolant is drawn;
a second inlet port on the valve housing and through which the coolant is drawn;

a first outlet port on the valve housing and through which the coolant is discharged;
a second outlet port on the valve housing and through which the coolant is discharged;
a ball valve rotatably disposed within the valve housing, and configured to either a) fluidically communicate the first inlet port and the first outlet port, and to fluidically communicate the second inlet port and the second outlet port, or b) to fluidically communicate the first inlet port and the second outlet port and fluidically communicate the second inlet port and the first outlet port;
an adapter coupled to the valve housing, and having a penetration hole through which the rotation shaft of the ball valve penetrates;
a driving unit housing connected to the adapter;
a driving unit provided in an interior of the driving unit housing, coupled to the rotation shaft, and configured to provide power to rotate the ball valve;
at least one drain chamber on an upper surface of the driving unit housing; and
a plurality of drain lines on the upper surface of the driving unit housing and fluidically communicating with the drain chamber, wherein each of the plurality of drain lines has a different length;
wherein the coolant leaking through the penetration hole of the adapter is temporarily stored in the at least one drain chamber of the driving unit housing, and is discharged to an exterior of the driving unit housing through the at least one drain line when the a leaked amount of the coolant exceeds a capacity of the drain chamber.

2. The control valve of claim 1, wherein the ball valve comprises:
a valve body having a partially spherical shape;
a rotation shaft extending from the valve body;
a first port, a second port, and a third port on a side surface of the valve body;
a fourth port on an upper surface of the valve body;
a first connection line fluidically connecting the first port and the second port; and
a second connection line fluidically connecting the third port and the fourth port,
wherein the first connection line either fluidically connects the first inlet port and the first outlet port, or fluidically connects the second inlet port and the first outlet port; and
wherein the second connection line either fluidically connects the first inlet port and the second outlet port, or fluidically connects the second inlet port and the second outlet port.

3. The control valve of claim 2, wherein the first connection line is spaced apart from the rotation shaft in a radial direction by a preset interval, and is along the radial direction from a first side surface to a second side surface of the valve body.

4. The control valve of claim 2, wherein the second connection line extends from the side surface of the valve body toward the upper surface of the valve body.

5. The control valve of claim 2, wherein a stopper protrusion is on a lower surface of the valve body.

6. The control valve of claim 5, wherein a limiter that the stopper protrusion contacts is in the adapter in order to limit rotation of the ball valve.

7. The control valve of claim 2, wherein the first port to the third port are disposed around the rotation shaft to form an obtuse angle with respect to each other.

8. The control valve of claim 1, wherein the drain chamber comprises the plurality of drain lines around the rotation shaft along a circumferential direction.

9. The control valve of claim 1, wherein at least one bypass chamber corresponding to the drain chamber is on a lower surface of the adapter.

10. The control valve of claim 1, further comprising an integrated electric water pump configured to pump the coolant discharged through the second outlet port.

11. A cooling system for a vehicle including the control valve of claim 1, the cooling system comprising:

a first cooling line through which the coolant flows and on which a battery, a heater, and a chiller are positioned; and a second cooling line through which the coolant flows and on which a condenser, a radiator, a reservoir tank, and an electric water pump are positioned;

wherein the control valve is positioned between the first cooling line and the second cooling line; and wherein, depending on an operation of the control valve, either the first cooling line and the second cooling line are fluidically connected, or the first cooling line and the second cooling line are fluidically separated.

* * * * *